(12) United States Patent
Yan et al.

(10) Patent No.: US 9,410,077 B2
(45) Date of Patent: Aug. 9, 2016

(54) METHOD FOR PREPARING ULTRA-LIGHT-WEIGHT (ULW) PROPPANT APPLIED ON OIL AND GAS WELLS

(71) Applicant: CHINA UNIVERSITY OF GEOSCIENCES (WUHAN), Wuhan, Hubei (CN)

(72) Inventors: Chunjie Yan, Hubei (CN); Yixia Wang, Hubei (CN); Tao Chen, Hubei (CN); Yonghan Zhang, Hubei (CN); Yuting Chen, Hubei (CN); Luru Jing, Hubei (CN)

(73) Assignee: CHINA UNIVERSITY OF GEOSIENCES (WUHAN), Wuhan, Hubei (CN)

( * ) Notice: Subject to any disclaimer, the term of this patent is extended or adjusted under 35 U.S.C. 154(b) by 0 days.

(21) Appl. No.: 14/825,851

(22) Filed: Aug. 13, 2015

(65) Prior Publication Data

US 2016/0046856 A1    Feb. 18, 2016

(30) Foreign Application Priority Data

Aug. 13, 2014 (CN) .......................... 2014 1 0398511

(51) Int. Cl.
*C09K 8/80* (2006.01)

(52) U.S. Cl.
CPC ............... *C09K 8/80* (2013.01); *C09K 2208/10* (2013.01)

(58) Field of Classification Search
None
See application file for complete search history.

(56) References Cited

U.S. PATENT DOCUMENTS 3,334,062 A * 8/1967 Brown .................... C01G 5/00
106/490

3,631,087 A * 12/1971 Lewis ................. C08F 283/122
525/479

(Continued)

FOREIGN PATENT DOCUMENTS

| CN | 101346324 A | 1/2009 |
| CN | 101605864 A | 12/2009 |

(Continued)

OTHER PUBLICATIONS

Wang Yixia et al., Reinforced performances of polymethyl methacrylate/silica fume composite spherical particles used as ultra-lightweight proppants, Journal of Reinforced Plastics and Composites, pp. 1-12, 2015.

(Continued)

*Primary Examiner* — Jeffrey Washville
(74) *Attorney, Agent, or Firm* — Tim Tingkang Xia, Esq.; Locke Lord LLP

(57) ABSTRACT

A method for preparing an ultra-light-weight (ULW) proppant usable in the oil and gas industry. The method uses silane coupling agent and organic acid to modify silica fume (SF) to obtain modified SF that is lipophilic and hydrophobic. The modified SF is used as inorganic phase, and the polymerizable monomer is used as organic phase, and the organic-inorganic composite microspheres are obtained through suspension polymerization. The ULW proppant is obtained by drying, screening, and pre-oxidization of the composite microsphere. The ULW proppant has a density of about 1.109 $g/cm^3$-1.278 $g/cm^3$, which is close to that of water, a crushing rate of <5% at 52 Mpa, and a crushing rate of <7% at 69 Mpa. In the oil and gas industry application, water or salt water can be used to replace the high viscose guanidine gum as carrier, thus reduced cost of fracturing, and reduced environment pollution.

16 Claims, 2 Drawing Sheets

(56) References Cited

U.S. PATENT DOCUMENTS

| | | | |
|---|---|---|---|
| 3,792,012 A * | 2/1974 | Zdaniewski | C08G 77/06 257/791 |
| 6,248,838 B1 | 6/2001 | Albright | |
| 6,451,953 B1 | 9/2002 | Albright | |
| 7,036,591 B2 | 5/2006 | Cannan et al. | |
| 7,803,740 B2 | 9/2010 | Bicerano et al. | |
| 7,803,741 B2 | 9/2010 | Bicerano et al. | |
| 7,803,742 B2 | 9/2010 | Bicerano et al. | |
| 7,902,125 B2 | 3/2011 | Bicerano et al. | |
| 8,006,754 B2 | 8/2011 | Bicerano | |
| 8,006,755 B2 | 8/2011 | Bicerano | |
| 8,088,718 B2 | 1/2012 | Bicerano et al. | |
| 8,258,083 B2 | 9/2012 | Bicerano | |
| 8,278,373 B2 | 10/2012 | Bicerano et al. | |
| 8,361,934 B2 | 1/2013 | Bicerano | |
| 8,455,403 B2 | 6/2013 | Bicerano et al. | |
| 8,461,087 B2 | 6/2013 | Bicerano | |
| 8,466,093 B2 | 6/2013 | Bicerano et al. | |
| 8,492,316 B2 | 7/2013 | Bicerano | |
| 9,006,314 B2 | 4/2015 | Bicerano | |
| 9,034,799 B2 | 5/2015 | Bicerano | |
| 2007/0066491 A1 * | 3/2007 | Bicerano | C09K 8/805 507/117 |
| 2007/0287636 A1 | 12/2007 | Heller | |
| 2009/0029878 A1 | 1/2009 | Bicerano | |
| 2011/0311719 A1 | 12/2011 | Bicerano | |
| 2011/0312859 A1 | 12/2011 | Bicerano | |
| 2012/0202719 A1 | 8/2012 | Bicerano | |
| 2013/0045901 A1 | 2/2013 | Bicerano | |
| 2013/0096037 A1 | 4/2013 | Bicerano et al. | |
| 2013/0102702 A1 * | 4/2013 | Hain | C08F 2/22 523/402 |
| 2013/0269211 A1 | 10/2013 | Deans et al. | |
| 2016/0024371 A1 * | 1/2016 | Vo | C09K 8/035 166/300 |

FOREIGN PATENT DOCUMENTS

| | | |
|---|---|---|
| CN | 102002356 A | 4/2011 |
| CN | 102127418 A | 7/2011 |
| CN | 102753648 A | 10/2012 |
| GB | 882058 * | 11/1961 |
| WO | 2011115800 A1 | 9/2011 |
| WO | 2012040276 A1 | 3/2012 |

OTHER PUBLICATIONS

Gaurav, A. et al., Evaluation of ultra-light-weight proppants for shale fracturing, Journal of Petroleum Science and Engineering 92-93, pp. 82-88, Jun. 2012.

Brannon, Harold D. et al., Maximizing Fracture Conductivity with Proppant Partial Monolayers: Theoretical Curiosity or Highly Productive Reality?, Society of Petroleum Engineers 90698, pp. 1-23, Sep. 2004.

Chen, Tao et al., Preparation of heat resisting poly(methyl methacrylate)/graphite composite microspheres used as ultra-light-weight proppants, Journal of Applied Polymer Science, DOI: 10.1002/APP.41924, pp. 1-8, 2015.

* cited by examiner

METHOD FOR PREPARING ULTRA-LIGHT-WEIGHT (ULW) PROPPANT APPLIED ON OIL AND GAS WELLS

CROSS-REFERENCE TO RELATED APPLICATION

This non-provisional application claims priority under 35 U.S.C. §119(a) to Chinese Patent Application No. CN 201410398511.3, filed Aug. 13, 2014, in the State Intellectual Property Office of P.R. China, which is hereby incorporated herein in its entirety by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

FIELD OF THE INVENTION

The present invention relates generally to the field of hydraulic fracturing in the oil and gas wells, and particular to method for preparing an ultra-light-weight (ULW) proppant applied on oil and gas wells.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the present invention.

Hydraulic fracturing is an important technology in the reservoir stimulation of oil and gas wells that have low permeability, and proppant is one of the critical materials which is used to hold open the fractures in subterranean formations around oil and gas wells created during hydraulic fracturing operations. Proppant is carried by fracturing fluids (polymer-based gels). The purpose of using proppant is to increase the permeability of the rock formation and allow oil or gas to flow to the wellbore. Furthermore, by this treatment, the yield of oil and gas can be improved, and the service life of wellbore can be extended. Thus, the stand or fall of proppant is one of the important factors to evaluate whether the fracturing technology is excellent.

The existing proppant mainly includes three kinds: high density proppant, medium density proppant, and low density proppant. On the premise of meeting the requirements of the compressive strength, the widespread traditional proppants are still quartz sand and ceramic proppant. However, due to high densities, the quartz sand and ceramic proppant have poor suspension feature and are easy to precipitate. Thus it is difficult to carry the traditional proppants to the wellbore. In order to make the traditional proppants reaching the wellbore effectively with fracturing fluids, the fracturing fluids must have high viscosity or high density. The main component of traditional fracturing fluids is guanidine gum, which is an organic polymer material. The price of the guanidine gum is rising year by year, and extensive use of guanidine gum will cause great damage to the stratum, decrease the permeability of fracture, lead to the groundwater pollution, reduce the oil and gas grade, and increase the cost of fracturing drilling.

Three kinds of ultra-light-weight (ULW) proppants (ULW-1, ULW-2, and ULW-3) have been evaluated (Gaurav, et al., 2012). ULW-1 is made of polymeric material with the apparent density of 1.08 $g/cm^3$, ULW-2 is a chemical modified walnut hull with the apparent density of 1.25 $g/cm^3$, and ULW-3 is a coated porous ceramic with the apparent density of 1.75 $g/cm^3$. ULW-1 is the most deformable with a Young's modulus value of 20,000 psi. ULW-3 is the least deformable with a Young's modulus value of 45,000 psi. ULW-1 and ULW-2 are deformable and generate little fines, and ULW-3 is brittle and forms fines at a high stress. The proppant conductivity decreases as the confining stress increases.

Chinese Patent No. CN200710188410.3 discloses a method and technology for production of low density proppant. The characteristic of this patent is that plant fiber is used as raw material, and is crushed and ground to plant fiber particles. Then the plant fiber particles are impregnated and solidified by modifying agent solution. After that, the modified plant fiber particles are coated by polymer resins. Finally, the ideal molding proppant is obtained by crushing and screening. The volume density of this described proppant is between 0.65 $g/cm^3$ and 1.10 $g/cm^3$, while the apparent density is between 1.10 $g/cm^3$ and 1.50 $g/cm^3$. However, the preparation technology of this patent is complicated relatively; the cost is high and the compressive strength of this proppant is poor.

The inventions of WO 2008/101209A1, U.S. Pat. No. 7,568,524 B2, and U.S. Published Patent Application No. 2008/0217010 A1) provide a new polymer proppant, where polyphenylene sulfide (PPS) particles are chosen as light weight proppant. PPS is an attractive engineering plastic and provides an excellent combination of properties. PPS is thermally stable, inherently non-flammable without flame retardant additives, and possesses excellent dielectric/insulating properties. The density of the proppant comprising PPS may have a density ranging from 1.1 to 1.8. Less expensive drilling fluid could be used and pumping requirements of the during fluid will be reduced by using PPS proppant.

U.S. Pat. No. 6,406,789 B1 and U.S. Pat. No. 6,632,527 B1 to Robert R. McDaniel et al. discloses composite particles made of a binder and filler material for use in subterranean formations. The filler is mixed with a first portion of the binder first to prepare evenly distributed particles as nuclear. Then a second portion of the binder is coated on the formed particle to improve strength of the particles. The particles made have specific plasticity and elasticity, thus can be used as proppant.

U.S. Pat. No. 4,425,384 to Thomas F. Brownscombe discloses a polymer reinforcing material, consisting of a particulate or filamentary mineral component having a thin polymer-interactive layer bonded to its surface by covalent bonding. The reinforcing material is prepared by contacting a particulate or filamentary mineral component which has reactive sites at its surface with certain organic compounds at reaction conditions at which a covalent chemical bond is established between the mineral surface and the organic compound by reaction of a reactive surface site of the mineral with a site-reactive atom or group of the organic compound.

Facing the existence of the above defects, it is important to research and develop a proppant which has the characteristics of low density and high compressive strength.

SUMMARY OF THE INVENTION

In one aspect of the present application, a proppant is provided which is suitable for being transported into fracture wells by slick water or salt water. The cost of fracturing operation is reduced greatly, the effect of energy conservation and emissions reduction are achieved by using this proppant. Furthermore, the use of the proppant avoids the use of guanidine gum and/or other polymer additives, reduces the pollution to the environment, and improves the economic benefit.

In one aspect, the present application relates to a high efficient method and technique to produce an ultra-light-weight (ULW) fracturing proppant applicable to oil and gas wells. Under the premise of meeting the standard of compressive strength, the proppant presence ultra light weight (apparent density: $1.109 \text{ g/cm}^3 \sim 1.278 \text{ g/cm}^3$). The production and construction cost can be reduced greatly by using this product and which is harmless to the environment.

In one embodiment, a method of preparing an ULW fracturing proppant includes the following steps: 1) Silica fume (SF) is dispersed in an organic solvent and heated with stirring. The silane coupling agent is added while the temperature is brought up to 75-95° C. (or in certain embodiments 80-95° C.), and reacted for 1-3 hours (h). After that, an organic acid is added and the reaction continues for 1-3 h. The modified SF was obtained after centrifuging and drying. 2) The modified SF, a cross-linking agent and an initiating agent are added into a monomer. The dispersant is soluble, and is dispersed in distilled water. Then the mixture of the modified SF, the cross-linking agent and the initiating agent were poured into the dispersion solution, and composite microspheres are synthesized by in situ suspension polymerization. Then, the expected fracturing proppant was obtained by filtering, washing, drying and screening with 20-80 mesh vibrating screen, and the density of the proppant is between $1.109 \text{ g/cm}^3$ and $1.278 \text{ g/cm}^3$.

In one embodiment, a method of preparing an ULW proppant includes the following steps:
dispersing a silica fume (SF) to an organic solvent for form a SF-organic solvent mixture;
heating the SF-organic solvent mixture to a temperature of 75-95° C.;
adding a silane coupling agent to the SF-organic solvent mixture to form a first reaction mixture, and allow a first reaction be performed for 1-3 hours (h);
adding an organic acid to the first reaction mixture that is reacted for 1-3 h, to form a second reaction mixture, and allow a second reaction be performed for 1-3 h;
centrifuging and drying the second reaction mixture that is reacted for 1-3 h, to obtain a modified SF;
adding the modified SF, a cross-linking agent and an initiating agent to a monomer solution to form a SF-monomer mixture, the monomer solution comprising at least one monomer;
dispersing at least one dispersant in distilled water to form a dispersant solution;
adding the SF-monomer mixture to the dispersant solution to synthesize composite microspheres by in situ suspension polymerization;
filtering, washing, drying, screening with 20-80 mesh, and pre-oxidizing the synthesized microspheres, to obtain the ULW proppant, wherein a density of the ULW proppant is in a range of $1.109 \text{ g/cm}^3$-$1.278 \text{ g/cm}^3$.

In one embodiment, a weight ratio of the silane coupling agent to the SF is about (0.2-1):20.

In one embodiment, a weight ratio of the organic acid to the SF is about (0.2-1):20.

In one embodiment, a weight ratio of the dispersant to the monomer is about (1.5-8):20.

In one embodiment, a weight ratio of the modified SF to the monomer is about (1-10):20.

In one embodiment, a weight ratio of the cross-linking agent to the monomer is about (1-5):20.

In one embodiment, a weight ratio of the initiating agent to the monomer is about (0.2-0.5):20.

In one embodiment, the particle size of the SF is about 200-500 nanometer (nm).

In one embodiment, the monomer includes one or more of methyl methacrylate, ethyl methacrylate, propyl methacrylate, butyl methacrylate, and styrene.

In one embodiment, the silane coupling agent includes one or more of 3-triethoxysilylpropylamine (KH550), γ-(2,3-epoxypropoxy) propy trimethoxy silane (KH560) or methacryloxy propyl trimethoxyl silane (KH570).

In one embodiment, the organic acid includes one or more of stearic acid, oleic acid, citric acid, and salicylic acid.

In one embodiment, the cross-linking agent includes one or more of divinyl benzene (DVB), cyclopentadiene, N,N-methylene double acrylamide (MA), and triene propyl cyanuricacid ester (TPCAE).

In one embodiment, the initiating agent includes one or more of benzoyl peroxide (BPO), cumene hydroperoxide (CHPO), and di-tert-butyl peroxide (DTBP).

In one embodiment, the dispersant includes one or more of sodium hydroxide (NaOH), six hydrated magnesium chloride ($MgCl_2 \cdot 6H_2O$), and polyvinyl alcohol (PVA).

In one embodiment, the mole ratio of NaOH to $MgCl_2 \cdot 6H_2O$ is about 2:1.

In one embodiment, after the step of filtering, washing, drying, screening with 20-80 mesh of the synthesized microsphere, the step of pre-oxidization includes:
placing the synthesized microsphere in an incubator having temperature control;
increasing a temperature at a rate of 3° C./minutes to 150-240° C.; and
incubating for 0.5-2 hours under air atmosphere.

The beneficial advantages according to certain embodiments of this invention, among other things, are as follows.

(1) The density of this fracturing proppant is between $1.109 \text{ g/cm}^3$ and $1.278 \text{ g/cm}^3$, and is close to the density of water. Thus, in oil and gas exploration, the proppant can be transported into deep fracture wells by slick water or salt water. The cost of fracturing operation can be reduced greatly, and the effect of energy conservation and emissions reduction by using this proppant is achieved. Further, the application of the proppant avoid using guanidine gum and/or other polymer additives, thus reduces the environment pollution, and improves the economic benefit.

(2) The compressive strength and heat resistance of the fracturing proppant can be improved by adding certain amount of mineral into polymer, thus the fracturing proppant is suitable for deep well fracturing.

(3) The preparation of the ULW fracturing proppant is simple. In addition, the fracturing proppant can be industrialized production with a lower price.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
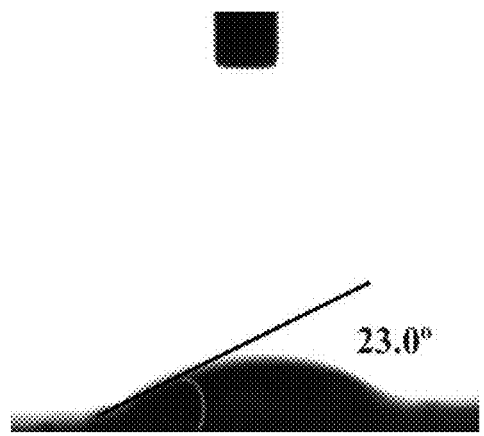
FIG. 1 is a schematic view of contact angle testing of SF before modification.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

The description will be made as to the embodiments of the present invention in conjunction with the accompanying drawings in FIGS. 1 and 2. In accordance with the purposes of this invention, as embodied and broadly described herein, this invention, in one aspect, relates to a method for preparing an ULW proppant applied on oil and gas wells. The method includes the following steps.

1) Silica fume (SF) is dispersed in organic solvent. The temperature is brought up to 75-95° C. (or in certain embodiments 80-95° C.) and a silane coupling agent is added with reacting for 1-3 hours. After that, an organic acid is added and the reaction continues for 1-3 hours. The modified SF is obtained after centrifuging and drying.

2) The modified SF, a cross-linking agent and an initiating agent are added into a monomer. The dispersant is soluble and is dissolved into distilled water. Then the mixture of the modified SF, the cross-linking agent, the initiating agent and the monomer is poured into the dispersant solution, and composite microspheres are synthesized by in situ suspension polymerization. Then the expected fracturing proppant is obtained by filtering, washing, drying and screening with 20-80 mesh vibrating screen, and the density is between 1.119 g/cm$^3$ and 1.278 g/cm$^3$.

The water-oil ratio is controlled between 4:1 and 6:1 during in situ suspension polymerization.

In certain embodiments, the weight ratio of the silane coupling agent to SF is about (0.2-1):20, and the weight ratio of the organic acid to the SF is (0.2-1):20.

In certain embodiment, the weight ratio of the dispersant to the monomer is about (1.5-8):20, the weight ratio of the modified SF to the monomer is (1-10):20, the weight ratio of the cross-linking agent to the monomer is about (1-5):20, and the weight ratio of the initiating agent to the monomer is about (0.2-0.5):20.

In one embodiment, the particle size of SF is 200-500 nm. In one embodiment, the organic solvent includes one or more of ethyl alcohol, methylbenzene, and acetone. In one embodiment, the monomer includes one or more of methyl methacrylate, ethyl methacrylate, propyl methacrylate, butyl methacrylate, and styrene.

In one embodiment, the silane coupling agent includes one or more of 3-triethoxysilylpropylamine (KH550), γ-(2,3-epoxypropoxy)propytrimethoxysilane (KH560), and methacryloxy propyl trimethoxyl silane (KH570). In one embodiment, the organic acid includes one or more of stearic acid, oleic acid, citric acid and salicylic acid.

In one embodiment, the cross-linking agent includes one or more of divinyl benzene (DVB), cyclopentadiene, N,N-methylene double acrylamide (MA) or triene propyl cyanuricacid ester (TPCAE).

In one embodiment, the initiating agent includes one or more of benzoyl peroxide (BPO), cumene hydroperoxide (CHPO) or di-tert-butyl peroxide (DTBP).

Crucially, the dispersant includes one or more of sodium hydroxide (NaOH), six hydrated magnesium chloride (MgCl$_2$.6H$_2$O), and polyvinyl alcohol (PVA). The mole ratio of NaOH to MgCl$_2$.6H$_2$O is about 2:1. The magnesium hydroxide precipitation formed in the reaction has the effect of dispersion. In one embodiment, PVA can also be replaced by one or more of calcium stearate (CS), liquid paraffin (LP) or gelatin.

In certain embodiments of this invention, the crushing rate of the ULW fracturing proppant is only 7% under 86 MPa, the volume density is between 0.663 g/cm$^3$ and 0.816 g/cm$^3$, and the apparent density is between 1.109 g/cm$^3$ and 1.278 g/cm$^3$. In oil and gas exploration, the proppant can be transported into deep fracture wells by slick water or salt water. Thus this invention can greatly reduce the cost of fracturing operation, and achieve the effect of energy conservation and emissions reduction. Further, the application of the proppant avoids the use of guar gum and/or other polymer additives, reduces the pollution to the environment, and improves the economic benefit.

Example 1

1) Modification of SF: 2 kilogram (kg) SF and 8 liter (L) ethyl alcohol were added into a 20 L reactor, and then 20 gram (g) KH570 was added dropwise. After heating and continuous stirring, 20 g citric acid was added, and stirring was continued, and then cooling, filtering, and drying at 105° C. were performed to obtain the modified SF.

2) Preparation of composite microspheres: 10 L water was added to a reactor and heated to 60° C., and then 40 g NaOH, 101.5 g MgCl$_2$.6H$_2$O, and 8.5 g polyvinyl alcohol (PVA) were placed into the water respectively and sequentially, and dispersed for 30 minutes. The temperature was heated to 85° C., the rotating speed was controlled at 290 revolutions per minute (rpm). Meanwhile, 100 g divinyl benzene (DVB) and 50 g benzoyl peroxide (BPO) were dissolved in 2 kg methyl methacrylate (MMA) monomer solution, and then 200 g modified SF was added to the monomer solution to form a mixture. After that, the mixture was poured into the reactor. The reaction was conducted for 2 hours to synthesize composite microspheres. The composite microspheres were filtered, washed using water, dried, and passed through 20-80 mesh to obtain processed composite microspheres. The processed composite microspheres were placed in an incubator with temperature control, the temperature of the incubator was increased to 240° C. at 3° C./minutes temperature increasing rate. After keeping warm for 0.5 hour under air atmosphere and cooling, ultra-light weight (ULW), high intensity fracturing proppant was obtained. In certain embodiments, the above steps of placing the sample (the processed composite microspheres) in the incubator with temperature control, and increasing the temperature of the incubator to 240° C. at 3° C./minutes temperature increasing rate have a function of pre-oxidization, thus is called a pre-oxidization step or pre-oxidizing.

Example 2

1) Modification of SF: 2 kg SF and 8 L methylbenzene (toluene) were added into a 20 L reactor, 30 g KH560 was added dropwise, and the temperature was heated to 95° C., and stirring at 95° C. for 2 h. After that, 30 g oleic acid was added, and stirring was continued for 2 h. Then, the modified SF was obtained by cooling, filtration, and drying.

2) Preparation of composite microspheres: 10 L water was added to a reactor and heated to 60° C., and then 80 g NaOH, 203 g MgCl$_2$.6H$_2$O, and 17 g PVA were placed into the water respectively and sequentially, and disperse for 30 minutes. The temperature was heated to 85° C., the rotating speed was controlled at 290 revolutions per minute (rpm). Meanwhile, 200 g divinyl benzene (DVB) and 40 g benzoyl peroxide (BPO) were dissolved in 2 kg methyl methacrylate (MMA) monomer solution, and then 200 g modified SF was added to the monomer solution to form a mixture. After that, the mixture was poured into the reactor. The reaction was conducted for 2 hours to synthesize composite microspheres. The composite microspheres were filtered, washed using water, dried, and passed through 20-80 mesh to obtain processed composite microspheres. The processed composite microspheres were placed in an incubator with temperature control, the temperature of the incubator was increased to 200° C. at 3° C./minutes temperature increasing rate. After keeping warm for 1 hour under air atmosphere, and cooling, ultra-light weight (ULW), high intensity fracturing proppant was obtained.

Example 3

1) Modification of SF: 2 kg SF and 8 L petroleum ether were added into a 20 L reactor, 40 g KH550 was added dropwise, and the temperature was heated to 75° C., and stirring at 75° C. for 2 h. After that, 40 g oleic acid was added, and stirring was continued for 2 h. Then, the modified SF was obtained by cooling, filtration, and drying.

2) Preparation of composite microspheres: 10 L water was added to a reactor and heated to 60° C., and then 129 g NaOH, 304.5 g MgCl$_2$.6H$_2$O, and 16 g PVA were placed into the water respectively and sequentially, and disperse for 30 minutes. The temperature was heated to 85° C., the rotating speed was controlled at 290 revolutions per minute (rpm). Meanwhile, 300 g cyclopentadiene and 35 g benzoyl peroxide (BPO) were dissolved in 2 kg ethyl methacrylate monomer solution, and then 400 g modified SF was added to the monomer solution to form a mixture. After that, the mixture was poured into the reactor. The reaction was conducted for 2 hours to synthesize composite microspheres. The composite microspheres were filtered, washed using water, dried, and passed through 20-80 mesh to obtain ultra-light weight (ULW), high intensity fracturing proppant.

Example 4

1) Modification of SF: 2 kg SF and 8 L petroleum ether were added into a 20 L reactor, 50 g KH550 was added dropwise, and the temperature was heated to 75° C., and stirring at 75° C. for 2 h. After that, 50 g stearic acid was added, and stirring was continued for 2 h. Then, the modified SF was obtained by cooling, filtration, and drying.

2) Preparation of composite microspheres: 10 L water was added to a reactor and heated to 60° C., and then 144 g NaOH, 365.4 g MgCl$_2$.6H$_2$O, and 16 g PVA were placed into the water respectively and sequentially, and disperse for 30 minutes. The temperature was heated to 85° C., the rotating speed was controlled at 290 revolutions per minute (rpm). Meanwhile, 400 g cyclopentadiene and 30 g benzoyl peroxide (BPO) were dissolved in 2 kg ethyl methacrylate monomer solution, and then 500 g modified SF was added to the monomer solution to form a mixture. After that, the mixture was poured into the reactor. The reaction was conducted for 2 hours to synthesize composite microspheres. The composite microspheres were filtered, washed using water, dried, and passed through 20-80 mesh to obtain ultra-light weight (ULW), high intensity fracturing proppant.

Example 5

1) Modification of SF: 2 kg SF and 8 L methylbenzene were added into a 20 L reactor, 40 g KH550 was added dropwise, and the temperature was heated to 95° C., and stirring at 95° C. for 2 h. After that, 40 g stearic acid was added, and stirring was continued for 2 h. Then, the modified SF was obtained by cooling, filtration, and drying.

2) Preparation of composite microspheres: 10 L water was added to a reactor and heated to 60° C., and then 160 g NaOH, 365.4 g $MgCl_2.6H_2O$, and 16 g PVA were placed into the water respectively and sequentially, and disperse for 30 minutes. The temperature was heated to 85° C., the rotating speed was controlled at 290 revolutions per minute (rpm). Meanwhile, 500 g cyclopentadiene and 30 g di-tert-butyl peroxide (DTBP) were dissolved in 2 kg propyl methacrylate monomer solution, and then 600 g modified SF was added to the monomer solution to form a mixture. After that, the mixture was poured into the reactor. The reaction was conducted for 2 hours to synthesize composite microspheres. The composite microspheres were filtered, washed using water, dried, and passed through 20-80 mesh to obtain ultra-light weight (ULW), high intensity fracturing proppant.

Example 6

1) Modification of SF: 2 kg SF and 8 L methylbenzene were added into a 20 L reactor, 40 g KH560 was added dropwise, and the temperature was heated to 95° C., and stirring at 95° C. for 2 h. After that, 50 g stearic acid was added, and stirring was continued for 2 h. Then, the modified SF was obtained by cooling, filtration, and drying.

2) Preparation of composite microspheres: 10 L water was added to a reactor and heated to 60° C., and then 200 g NaOH, 507.5 g $MgCl_2.6H_2O$, and 26 g PVA were placed into the water respectively and sequentially, and disperse for 30 minutes. The temperature was heated to 85° C., the rotating speed was controlled at 290 revolutions per minute (rpm). Meanwhile, 300 g divinyl benzene and 35 g cumene hydroperoxide (CHPO) were dissolved in 2 kg propyl methacrylate monomer solution, and then 600 g modified SF was added to the monomer solution to form a mixture. After that, the mixture was poured into the reactor. The reaction was conducted for 2 hours to synthesize composite microspheres. The composite microspheres were filtered, washed using water, dried, and passed through 20-80 mesh to obtain processed composite microspheres. The processed composite microspheres were placed in an incubator with temperature control, the temperature of the incubator was increased to 150° C. at 3° C./minutes temperature increasing rate. After keeping warm for 2 hour under air atmosphere, and cooling, ultra-light weight (ULW), high intensity fracturing proppant was obtained.

Example 7

1) Modification of SF: 2 kg SF and 8 L methylbenzene were added into a 20 L reactor, 40 g KH560 was added dropwise, and the temperature was heated to 95° C., and stirring at 95° C. for 2 h. After that, 50 g stearic acid was added, and stirring was continued for 2 h. Then, the modified SF was obtained by cooling, filtration, and drying.

2) Preparation of composite microspheres: 10 L water was added to a reactor and heated to 60° C., and then 200 g NaOH, 507.5 g $MgCl_2.6H_2O$, and 30 g PVA were placed into the water respectively and sequentially, and disperse for 30 minutes. The temperature was heated to 85° C., the rotating speed was controlled at 290 revolutions per minute (rpm). Meanwhile, 300 g divinyl benzene and 35 g CHPO were dissolved in 2 kg butyl methacrylate monomer solution, and then 600 g modified SF was added to the monomer solution to form a mixture. After that, the mixture was poured into the reactor. The reaction was conducted for 2 hours to synthesize composite microspheres. The composite microspheres were filtered, washed using water, dried, and passed through 20-80 mesh to obtain ultra-light weight (ULW), high intensity fracturing proppant.

Example 8

1) Modification of SF: 2 kg SF and 8 L methylbenzene were added into a 20 L reactor, 40 g KH550 was added dropwise, and the temperature was heated to 95° C., and stirring at 95° C. for 2 h. After that, 40 g stearic acid was added, and stirring was continued for 2 h. Then, the modified SF was obtained by cooling, filtration, and drying.

2) Preparation of composite microspheres: 10 L water was added to a reactor and heated to 60° C., and then 224 g NaOH, 568.4 g $MgCl_2.6H_2O$, and 30 g PVA were placed into the water respectively and sequentially, and disperse for 30 minutes. The temperature was heated to 85° C., the rotating speed was controlled at 290 revolutions per minute (rpm). Meanwhile, 300 g divinyl benzene and 35 g BPO were dissolved in 2 kg butyl methacrylate monomer solution, and then 900 g modified SF was added to the monomer solution to form a mixture. After that, the mixture was poured into the reactor. The reaction was conducted for 2 hours to synthesize composite microspheres. The composite microspheres were filtered, washed using water, dried, and passed through 20-80 mesh to obtain ultra-light weight (ULW), high intensity fracturing proppant.

Example 9

1) Modification of SF: 2 kg SF and 8 L methylbenzene were added into a 20 L reactor, 40 g KH550 was added dropwise, and the temperature was heated to 95° C., and stirring at 95° C. for 2 h. After that, 40 g stearic acid was added, and stirring was continued for 2 h. Then, the modified SF was obtained by cooling, filtration, and drying.

2) Preparation of composite microspheres: 10 L water was added to a reactor and heated to 60° C., and then 224 g NaOH, 568.4 g $MgCl_2.6H_2O$, and 30 g PVA were placed into the water respectively and sequentially, and disperse for 30 minutes. The temperature was heated to 85° C., the rotating speed was controlled at 290 revolutions per minute (rpm). Meanwhile, 300 g N, N-methylene double acrylamide (MA) and 50 g CHPO were dissolved in 2 kg styrene monomer solution, and then 900 g modified SF was added to the monomer solution to form a mixture. After that, the mixture was poured into the reactor. The reaction was conducted for 2 hours to synthesize composite microspheres. The composite microspheres were filtered, washed using water, dried, and passed through 20-80 mesh to obtain ultra-light weight (ULW), high intensity fracturing proppant.

Example 10

1) Modification of SF: 2 kg SF and 8 L methylbenzene were added into a 20 L reactor, 40 g KH550 was added dropwise, and the temperature was heated to 95° C., and stirring at 95° C. for 2 h. After that, 40 g stearic acid was added, and stirring was continued for 2 h. Then, the modified SF was obtained by cooling, filtration, and drying.

2) Preparation of composite microspheres: 10 L water was added to a reactor and heated to 60° C., and then 224 g NaOH, 568.4 g $MgCl_2.6H_2O$, and 76 g PVA were placed into the water respectively and sequentially, and disperse for 30 minutes. The temperature was heated to 85° C., the rotating speed was controlled at 290 revolutions per minute (rpm). Meanwhile, 300 g N, N-methylene bis acrylamide (MA) and 50 g CHPO were dissolved in 2 kg styrene monomer solution, and then 1 kg modified SF was added to the monomer solution to form a mixture. After that, the mixture was poured into the reactor. The reaction was conducted for 2 hours to synthesize composite microspheres. The composite microspheres were filtered, washed using water, dried, and passed through 20-80 mesh to obtain ultra-light weight (ULW), high intensity fracturing proppant.

The main performance indexes and test methods of this invention are as follows.

The volume density, apparent density, sphericity and crushing rate of this ULW proppant were all measured and determined according to the Petroleum and Gas Industrial Industry Standard of China (SY/T 5108-2006), which was named as specification and recommended testing practice for proppants used in hydraulic fracturing operations. The detailed results were shown in Table 1.

The lipophilic and hydrophobic performance of modified SF was measured by the Contact Angle Meter (JC2000Y, China). The detailed results are shown in FIG. 1.

TABLE 1

Main performance indexes of this invention

| EXAMPLE | volume density ($g/cm^3$) | apparent density ($g/cm^3$) | sphericity | crushing rate (52 Mpa/ 69 Mpa) | yield (20-80 mesh) |
| --- | --- | --- | --- | --- | --- |
| 1 | 0.663 | 1.109 | 0.9 | 0%/0.3% | 91.5% |
| 2 | 0.670 | 1.138 | 0.9 | 0%/0.5% | 86.3% |
| 3 | 0.678 | 1.157 | 0.9 | 0.6%/1.0% | 89.7% |
| 4 | 0.685 | 1.177 | 0.9 | 1.0%/1.5% | 83.8% |
| 5 | 0.694 | 1.183 | 0.9 | 1.4%/2.2% | 90.3% |
| 6 | 0.708 | 1.187 | 0.9 | 1.5%/2.5% | 79.3% |
| 7 | 0.718 | 1.213 | 0.9 | 1.7%/2.9% | 87.9% |
| 8 | 0.732 | 1.255 | 0.9 | 2.2%/3.6% | 83.4% |
| 9 | 0.746 | 1.278 | 0.8 | 3.5%/5.5% | 70.5% |
| 10 | 0.762 | 1.275 | 0.8 | 4.2%/6.8% | 59.3% |

It can be seen from Table 1 that:

(1) The density of this fracturing proppant (apparent density: 1.109~1.278 $g/cm^3$) is close to water, so in oil and gas exploration, the proppant can be transported into deep fracture wells by slick water or salt water. Further, the compressive strength performance of this proppant is excellent and up to the standard of SY/T 5108-2006, thus which was suitable for deep well fracturing.

(2) In certain embodiments of this invention, the yield of the proppant is high, thus the fracturing proppant can be industrialized production and the cost of fracturing operation can be reduced significantly. Finally, it is advantageous to improve the oil and gas output.

Figure 2:
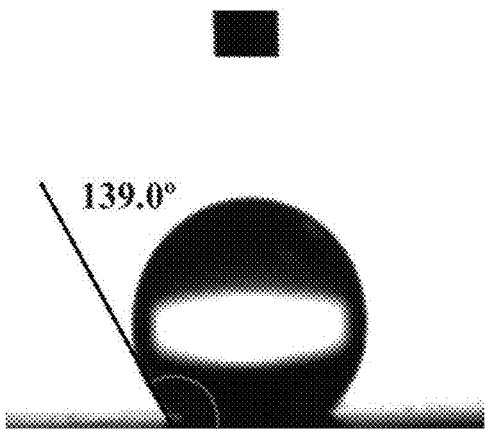
FIG. 2 is a schematic view of contact angle testing of SF after modification.

It can be seen from FIG. 1 and FIG. 2 that:

Before modification, the SF is hydrophilic and the contact angle is 23.0°. After modification, the modified SF is lipophilic and the contact angle is 139.0°. This excellent lipophilic and hydrophobic performance of modified SF is advantageous to the compound between SF and the organic monomer. Thus the performances and yield of the composite microspheres can be improved.

Figure 3:
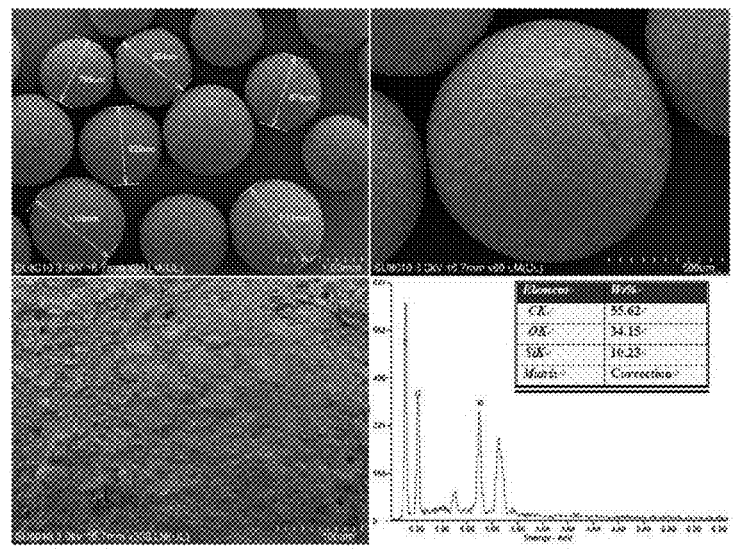
FIG. 3 is a schematic view of Field Emission Scanning Electron Microscopy (FESEM) and Energy Dispersive Spectroscopy (EDX) of ULW proppant of Example 5.

FIG. 3 is a schematic view of Field Emission Scanning Electron Microscopy (FESEM) and Energy Dispersive Spectroscopy (EDX) of ULW proppant of Example 5.

Figure 4:
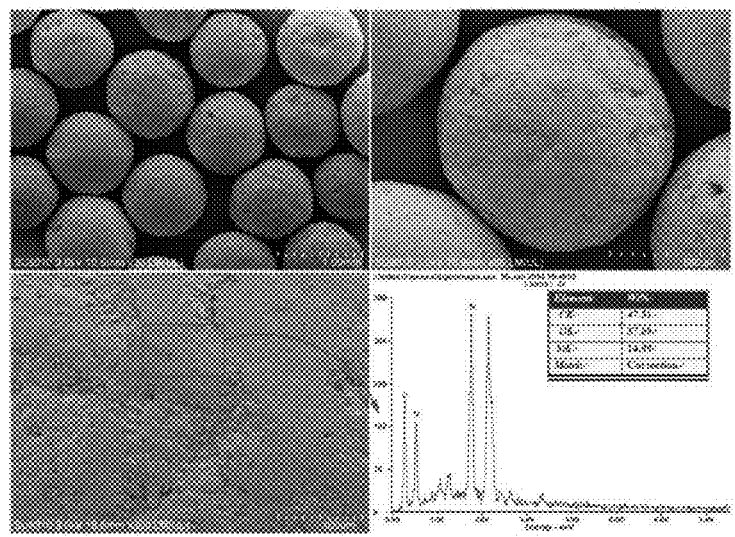
FIG. 4 is a schematic view of FESEM and EDX of ULW proppant of Example 9.

FIG. 4 is a schematic view of FESEM and EDX of ULW proppant of Example 9.

As shown in FIG. 3 and FIG. 4, FESEM analysis illustrated that the SF particles were dispersed in microspheres and the ULW proppant had good sphericity and roundness. The ULW proppants became rougher with increase of SF. The profile of the two ULW proppants (PMMA/SF and PMMA/FA) becomes loose. Furthermore, the 2-50 μm macropores appeared and increased in the fracture surfaces of PMMA/SF ULW proppants with the increase of SF. The EDX verified that PMMA/SF ULW proppants not only have C and O element, but also have Si element. And the content of Si increased with the increase of SF. These results further validated that the modified SF were successfully blended into the PMMA materials.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments are chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for preparing an ultra-light-weight (ULW) proppant, comprising the steps of:
    dispersing a silica fume (SF) to an organic solvent for form a SF-organic solvent mixture;
    heating the SF-organic solvent mixture to a temperature of 75-95° C.;
    adding a silane coupling agent to the SF-organic solvent mixture to form a first reaction mixture, and allow a first reaction be performed for 1-3 hours (h);
    adding an organic acid to the first reaction mixture that is reacted for 1-3 h, to form a second reaction mixture, and allow a second reaction be performed for 1-3 h;
    centrifuging and drying the second reaction mixture that is reacted for 1-3 h, to obtain a modified SF;
    adding the modified SF, a cross-linking agent and an initiating agent to a monomer solution to form a SF-monomer mixture, the monomer solution comprising at least one monomer;
    dispersing at least one dispersant in distilled water to form a dispersant solution;
    adding the SF-monomer mixture to the dispersant solution to synthesize composite microspheres by in situ suspension polymerization;
    filtering, washing, drying, screening with 20-80 mesh, and pre-oxidizing the synthesized microspheres, to obtain the ULW proppant, wherein a density of the ULW proppant is in a range of 1.109 $g/cm^3$-1.278 $g/cm^3$,
    wherein after the step of filtering, washing, drying, screening with 20-80 mesh of the synthesized microsphere, the step of pre-oxidization comprises:
    placing the synthesized microsphere in an incubator having temperature control;
    increasing a temperature at a rate of 3° C./minutes to 150-240° C.; and
    incubating for 0.5-2 hours under air atmosphere.

2. The method of claim 1, wherein a weight ratio of the silane coupling agent to the SF is about (0.2-1):20.

3. The method of claim 1, wherein a weight ratio of the organic acid to the SF is about (0.2-1):20.

4. The method of claim 1, wherein a weight ratio of the dispersant to the monomer is about (1.5-8):20.

5. The method of claim 1, wherein a weight ratio of the modified SF to the monomer is about (1-10):20.

6. The method of claim 1, wherein a weight ratio of the cross-linking agent to the monomer is about (1-5):20.

7. The method of claim 1, wherein a weight ratio of the initiating agent to the monomer is about (0.2-0.5):20.

8. The method of claim 1, wherein a particle size of the SF is about 200-500 nm.

9. The method of claim 1, wherein the monomer comprises at least one of methyl methacrylate, ethyl methacrylate, propyl methacrylate, butyl methacrylate, and styrene.

10. The method of claim 1, wherein the silane coupling agent comprises at least one of 3-triethoxysilylpropylamine, γ-(2,3-epoxypropoxy)propytrimethoxysilane, and methacryloxy propyl trimethoxyl silane.

11. The method of claim 1, wherein the organic acid comprises at least one of stearic acid, oleic acid, citric acid, and salicylic acid.

12. The method of claim 1, wherein the cross-linking agent comprises at least one of divinyl benzene (DVB), cyclopentadiene, N, N-methylene bis acrylamide (MA), and triene propyl cyanuric acid ester (TPCAE).

13. The method of claim 1, wherein the initiating agent comprises at least one of benzoyl peroxide (BPO), cumene hydroperoxide (CHPO), and di-tert-butyl peroxide (DTBP).

14. The method of claim 1, wherein the dispersant comprises at least one of sodium hydroxide (NaOH), six hydrated magnesium chloride ($MgCl_2.6H_2O$), and polyvinyl alcohol (PVA).

15. The method of claim 1, wherein the dispersant comprises sodium hydroxide (NaOH) and six hydrated magnesium chloride ($MgCl_2.6H_2O$), and a mole ratio of the NaOH to the $MgCl_2.6H_2O$ is about 2:1.

16. The method of claim 1, wherein the organic solvent comprises at least one of ethyl alcohol, methylbenzene, and acetone.

* * * * *